April 20, 1965 R. M. WOLFE 3,179,926

FERROELECTRIC LOGIC CIRCUITS

Filed Sept. 27, 1960

INVENTOR
R. M. WOLFE
BY
William H. Kamstra
ATTORNEY

United States Patent Office 3,179,926

Patented Apr. 20, 1965

3,179,926

FERROELECTRIC LOGIC CIRCUITS

Robert M. Wolfe, Colonia, N.J., assignor to Bell Telephone Laboratories, Incorporated, New York, N.Y., a corporation of New York Filed Sept. 27, 1960, Ser. No. 58,838
11 Claims. (Cl. 340—173.2)

This invention relates to electrical circuits for performing logic functions and more particularly to such circuits employing ferroelectric capacitors.

As disclosed in Patent 2,717,372, issued September 6, 1955, of J. R. Anderson, ferroelectric materials when subjected to an electric field exhibit a relationship between electric field intensity and polarization of the general form of the hysteresis loop exhibited by ferromagnetic materials. By utilizing the ferroelectric material as the dielectric of a capacitor, this hysteresis effect can be used for storage and read out of information. Generally, the ferroelectric material is polarized in one direction initially and information is subsequently stored by applying voltages to the electrodes of the capacitor to reverse this polarization. The stored information is then read out by applying voltages to the electrodes of the capacitor to restore the initial polarization. The magnitude of the output pulse will depend on the polarity of the polarization of the ferroelectric material, and thus on whether information has been stored in the capacitor, because of the variations in capacitance values as different portions of the hysteresis loop of the ferroelectric dielectric are traversed. Thus the method of storage and read out for a ferroelectric capacitor is closely analogous to that utilized for ferromagnetic devices.

Ferromagnetic devices have also proved useful for the generation of logic functions as well as for the storage of binary information. Thus such devices as toroidal cores and multiapertured structures have proved particularly useful in the field of logic switching.

It is an object of this invention to provide a new and improved logic switching circuit.

It is a further object of this invention to provide an electrical information handling circuit utilizing only ferroelectric capacitors as the bistable elements thereof.

It is a still further object of this invention to provide a compact, efficient and economical logic switching circuit utilizing the properties of ferroelectric materials.

It is yet another object of the present invention to provide a logic switching circuit which does not require that the individual input signals to the circuit be applied concurrently.

The above and other objects are realized in one embodiment according to the principles of this invention comprising a plurality of input and output ferroelectric capacitors with one plate of each of the capacitors being connected to a common terminal. Input terminals connected to the other plates of the input capacitors provide the means for introducing the input variables. Outputs are taken from the other plates of the output capacitors which are connected to ground through load resistors.

Initially, all of the capacitors have remanent charges therein of the same polarization. For a particular dielectric material, the amount of charge made available during the switching of a ferroelectric capacitor is directly proportional to the electrode area of the capacitor and the coercive voltage required to switch the capacitor is proportional to the thickness of the dielectric material. All of the capacitors in the present embodiment are selected to have characteristics which enable them to switch substantially the same amounts of charge. All of the input capacitors and the first one of the output capacitors are also selected to have coercive voltages of substantially the same magnitude. Succeeding ones of the output capacitors, however, are selected to have successively greater coercive voltages. Since two or more ferroelectric capacitors connected in series cannot be switched unless they are initially polarized in the same direction, the input capacitors are thus effectively isolated one from another. Input signals are applied to any one or more of the input capacitors to switch particular ones of the output capacitors. The voltage signals applied to the input capacitors also appear at the common terminal of the input and output capacitors and are of a magnitude sufficient to switch both one of the input capacitors and that one of the output capacitors having the greatest coercive voltage. However, since the switching of any one of the input capacitors transmits only enough charge to switch one of the output capacitors, only one output capacitor switches responsive to the switching of one input capacitor. The switching of an output capacitor having a lower coercive voltage will be substantially completed before an output capacitor having a higher coercive voltage starts to switch. Since the output capacitors have varying coercive voltages, the switching of any one of the input capacitors will be accompanied by the switching of that one of the unswitched output capacitors having the lowest coercive voltage. Thus the particular output capacitors switched and therefore the output signals generated, are determined by the number, rather than the particular sequence, of input terminals energized. Employing this operation, various logic functions to be described in detail hereinafter are made possible in this embodiment.

In another illustrative embodiment an input ferroelectric capacitor, a plurality of control ferroelectric capacitors and an output ferroelectric capacitor all have one of their plates connected to a common terminal. All of the capacitors are again chosen to have characteristics enabling them to switch substantially the same amounts of charge, and all of the capacitors other than the output capacitor are chosen to have coercive voltages of substantially the same magnitude. The output capacitor is selected to have a coercive voltage substantially greater than that of the other capacitors. Initially the capacitors all have remanent charges of the same polarity. Signals applied to the other plate of the input capacitor will ordinarily switch this capacitor and one of the control capacitors. However, if input signals are also applied to the other plates of the control capacitors to prevent their switching, the signal applied to the input capacitor will also switch the output capacitor. Thus an output signal appears across a load resistor connected to the other plate of the output capacitor only when input signals are applied to all of the other capacitors. This embodiment of the present invention therefore provides a device capable of performing the logical AND function.

It is accordingly a feature of this invention that a logic switching circuit include a plurality of input ferroelectric capacitors and a plurality of output ferroelectric capacitors and that one plate of each of the input and output capacitors be connected to a common terminal.

According to another feature of this invention all of the ferroelectric capacitors of a logic switching circuit transfer the same amount of charge upon switching.

According to still another feature of this invention, all of the input capacitors of a ferroelectric logic switching circuit have the same coercive voltage, while successive ones of the output capacitors have successively larger coercive voltages.

According to yet another feature of this invention, a device for performing the logical AND function has a plurality of input ferroelectric capacitors and a single output ferroelectric capacitor with one plate of each of the capacitors connected to a common terminal.

The foregoing and other objects and features of this invention will be more clearly understood from a consideration of the detailed description thereof which follows when taken in conjunction with the following drawing, in which.

Figure 1:
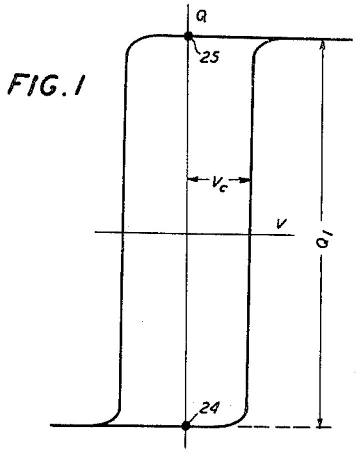
FIG. 1 depicts an idealized hysteresis characteristic of a ferroelectric capacitor utilized in the present invention.
Figure 2:
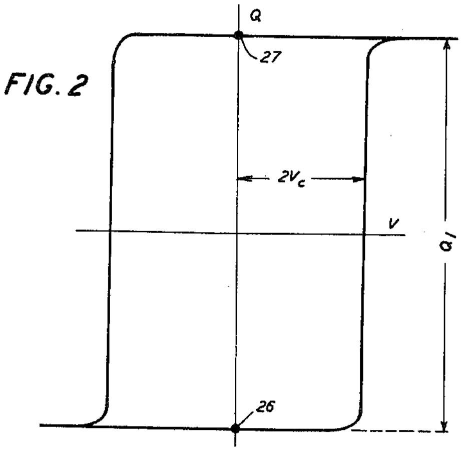
FIG. 2 depicts an idealized hysteresis characteristic of a ferroelectric capacitor used in the present invention having the same charge switching capacity but twice the coercive voltage of the capacitor whose hysteresis characteristic is depicted in FIG. 1.
Figure 3:
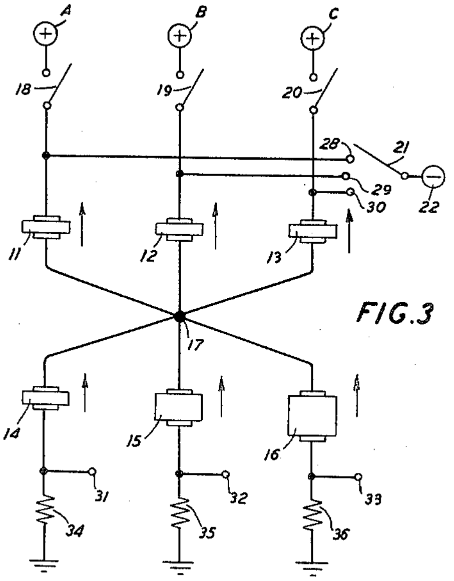
FIG. 3 depicts one illustrative embodiment of a logic switching circuit according to the principles of this invention.

A specific illustrative embodiment of this invention is a logic circuit performing the symmetrical functions $A+B+C$, $AB+AC+BC$ and ABC as shown in FIG. 3. Each of the input capacitors 11, 12 and 13 and each of the output capacitors 14, 15 and 16 has one of its plates connected to the common terminal 17. Each of the capacitors 11, 12, 13 and 14 advantageously has a substantially rectangular hysteresis characteristic such as that shown in FIG. 1, while the capacitor 15 has a hysteresis characterisitc such as that shown in FIG. 2. Capacitor 15 is thus capable of transferring the same amount of charge upon switching as do capacitors 11 through 14 but has a coercive voltage twice that of these capacitors. Similarly, the capacitor 16 is chosen to have the same charge switching capability but three times the coercive voltage of the capacitors 11 through 14. In view of FIGS. 1 and 2 a separate figure showing the hysteresis characteristics of capacitor 16 is not included in the drawing.

The other plates of the input capacitors 11, 12 and 13 are connected, respectively, via the switches 18, 19 and 20 to sources of input information A, B and C shown as positive voltage sources and are also connected through terminals 28, 29 and 30 and a rotary switch 21 to a source of negative reset signals 22. The other plates of the output capacitors 14, 15 and 16 are connected to output terminals 31, 32 and 33, respectively, and through load resistors 34, 35 and 36, respectively, to ground.

Figure 4:
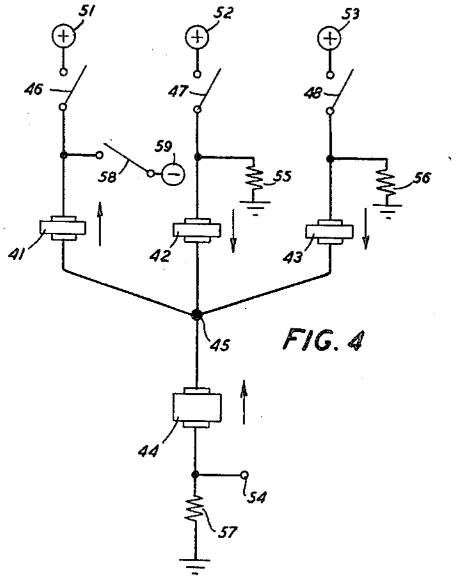
FIG. 4 depicts another illustrative embodiment of a logic switching circuit according to the principles of this invention.

Another specific embodiment of this invention is the AND circuit shown in FIG. 4. Input ferroelectric capacitor 41, control ferroelectric capacitors 42 and 43, and output ferroelectric capacitor 44 each have one of their plates connected to a common terminal 45. The other plate of capacitor 41 is connected via switch 46 to input source 51 shown as a source of positive voltage and the other plates of capacitors 42 and 43 are connected via switches 47 and 48, respectively, to input sources 52 and 53, respectively, shown as sources of positive voltage, and are also connected to ground via load resistors 55 and 56, respectively. Similarly, the other plate of the output capacitor 44 is connected to output terminal 54 and is also connected to ground via load resistor 57. In addition, the plate of capacitor 41 connected to the switch 46 is connected via switch 58 to a source of negative reset signals 59. Each of the capacitors 41, 42 and 43 advantageously has a hysteresis characteristic similar to that shown in FIG. 1, while the output capacitor 44 has a characteristic similar to that shown in FIG. 2. Thus all of the capacitors have the same charge transferring capacity but capacitor 44 has twice the coercive voltage of the other capacitors.

Bearing in mind the foregoing organization of the depicted embodiments of circuits according to the principles of this invention, a detailed description of illustrative operations of these circuits will now be set forth.

Initially all of the capacitors 11 through 16 of the circuit shown in FIG. 3 are driven to the same condition of remanent polarization by negative reset signals applied from source 22 upon the sequential contacting of switch 21 with the terminals 28, 29 and 30. The capacitors may at this time be considered to be polarized in an upward direction as viewed in the drawing and as shown by the arrows in FIG. 3. Positive input signals are subsequently applied to the input capacitors 11, 12 and 13 from the input sources A, B and C by the selective closing of the switches 18, 19 and 20. The input capacitors 11, 12 and 13 and the output capacitor 14 all have hysteresis characteristics similar to that shown in FIG. 1. These capacitors are thus able to transfer an amount of charge $Q_1$ in switching between remanent points 24 and 25 and have a coercive voltage equal to $V_c$. Output capacitor 15 has a hysteresis characteristic similar to that shown in FIG. 2 and thus also transfers an amount of charge $Q_1$ in switching between remanent points 26 and 27 but has a coercive voltage equal to $2V_c$. The output capacitor 16 has hysteresis characteristics enabling it to also transfer an amount of charge $Q_1$ upon the application of a coercive voltage equal to $3V_c$. For ferroelectric capacitors utilizing the same dielectric material the amount of charge transferred upon switching is proportional to the area of their electrodes while the coercive voltage is dependent upon the thickness of the dielectric material between the electrodes.

Upon the closing of any one of the switches 18, 19 and 20, that one of the input capacitors 11, 12 and 13 associated with the particular switch being closed will have its remanent polarization reversed and will transfer an amount of charge $Q_1$. The reversal of this input capacitor is accompanied by the reversal of output capacitor 14. Since capacitor 14 has a lower coercive voltage than do either of the other output capacitors it will switch prior to the switching of the other capacitors. Similarly, upon the closing of any two of the switches 18, 19 and 20, output capacitors 14 and 15 will have their remanent polarizations reversed. Output capacitor 16 will therefore not switch unless all three of the input capacitors are switched. Thus the closing of switch 19 will switch capacitors 12 and 14. The subsequent closing of switch 20 will switch capacitors 13 and 15, and the subsequent closing of switch 18 will switch capacitors 11 and 16. The signal applied from any one of the input sources is established to be sufficient to switch both output capacitor 16 and one of the input capacitors. Accordingly in this embodiment it must be of a magnitude of at least $4V_c$ volts, that is, the sum of the coercive voltages of capacitor 16 and any one of the input capacitors.

The switching of the output capacitors may be accomplished by either simultaneous or sequential closing of the switches 18, 19 and 20. Upon the switching of any one of the output capacitors an output signal is available at the output terminal associated with that capacitor. Thus upon the switching of capacitor 14 an output signal appears at terminal 31. Since the capacitor 14 switches responsive to the application of input signals from any one of the input sources A, B and C, signals appear at terminal 31 according to the logic function $A+B+C$. Since the capacitor 15 switches responsive to the application of input signals from any two of the sources A, B and C, signals appear at terminal 32 according to the logic function $AB+BC+AC$. Similary, a signal appears on terminal 33 associated with capacitor 16 only upon the application of signals from all three of the input sources A, B, and C and thus gives the AND function ABC. After each logic operation, the capacitors 11 through 16 may again be reset to the same remanent conditions by operating the switch 21 through its contacting terminals 28, 29 and 30 to apply the negative reset signals from the source 22.

In the embodiment of this invention shown in FIG. 4 all of the ferroelectric capacitors 41 through 44 are initially driven to predetermined conditions of remanent polarization by the application of a negative reset signal from source 59 upon the closing of switch 58. The capacitors may at this time be considered to be polarized in the directions indicated by the arrows shown in FIG. 4. Positive input signals are subsequently simultaneously applied from sources 51, 52 and 53 by the selective closing of switches 46, 47, and 48. The capacitors 41, 42 and 43 all have hysteresis characteristics similar to that shown in FIG. 1 while output capacitor 44 has a hysteresis characteristic similar to that shown in FIG. 2. The capacitors 41 through 44 are thus all capable of transferring the same amount of charge but the output capacitor 44 has twice the coercive voltage of the other capacitors.

The application of an input signal from source 51 to capacitor 41 by the closing of switch 46 will cause the switching of the remanent polarization of capacitor 41. Ordinarily the switching of capacitor 41 will be accompanied by the partial switching of capacitors 42 and 43. However, if positive signals are applied to capacitors 42 and 43 from the sources 52 and 53, respectively, by the closing of switches 47 and 48, respectively, simultaneously with the closing of switch 46, the capacitors 42 and 43 are unable to switch and output capacitor 44 switches along with capacitor 41. Upon the switching of capacitor 44 an output signal appears at terminal 54. If a signal is applied to only a selected one of the capacitors 42 and 43 simultaneously with the signal applied to capacitor 41 then the other one of the capacitors 42 and 43 will switch along with capacitor 41. Therefore a signal appears at output terminal 54 only if input signals are simultaneously applied to the capacitors 41, 42 and 43 from the sources 51, 52 and 53. The signal appearing at the output terminal 54 thus gives the logical AND function. The capacitors 41 through 44 are restored to their normal reset conditions by the application of a negative reset signal from the source 59 via the switch 58.

What have been described are considered to be only two illustrative embodiments of the present invention. Thus various other arrangements may be devised by one possessing ordinary skill in the art without departing from the spirit and scope of this invention.

What is claimed is:

1. An electrical circuit comprising a plurality of input ferroelectric capacitors, one electrode of each of said capacitors being directly connected to a common terminal, all of said capacitors having substantially the same hysteresis characteristics, means for setting the ferroelectric material of each of said capacitors to a predetermined condition of remanent polarization, a plurality of means for applying input signals selectively to the other electrodes of respective ones of said input capacitors, first ferroelectric means connected to said common terminal for detecting the application of an input signal to any one of said input capacitors, and second ferroelectric means also connected to said common terminal for detecting the application of input signals to any two of said input capacitors.

2. An electrical circuit according to claim 1 further comprising third ferroelectric means also connected to said common terminal for detecting the application of input signals to all of said input capacitors.

3. An electrical circuit according to claim 1 in which said first ferroelectric means for detecting the application of an input signal to any one of said input capacitors comprises a branch circuit including a first ferroelectric output capacitor having one of its electrodes connected to said common terminal, said capacitor having hysteresis characteristics such that it transfers the same amount of charge upon switching as do said input capacitors, and means for detecting the reversal of polarization of said first ferroelectric output capacitor responsive to the application of input signal to any one of said input capacitors.

4. An electrical circuit according to claim 3 in which said second ferroelectric means for detecting the application of input signals to any two of said input capacitors comprises a branch circuit including a second ferroelectirc output capacitor having one of its electrodes connected to said common terminal, said second ferroelectric output capacitor having hysteresis characteristics such that it transfers the same amount of charge upon reversal of its polarization as do said input capacitors and has a coercive voltage substantially greater than that of said first ferroelectric output capacitor, and means for detecting the reversal of polarization of said second ferroelectric output capacitor responsive to the application of input signals to any two of said input capacitors.

5. An electrical circuit comprising a first, second and third ferroelectric capacitor, one electrode of each of said capacitors being directly connected to a common terminal, all of said capacitors having substantially equal electrode areas, said third capacitor having a dielectric material of greater thickness than that of said other capacitors, means for setting the ferroelectric material of each of said capacitors to a predetermined condition of remanent polarization, first and second means for applying signals selectively to the other electrodes of said first and second capacitors, respectively, means for preventing a reversal of polarization of said third capacitor responsive to a signal applied to only one of said first and second capacitors comprising a fourth ferroelectric capacitor connected to said common terminal, and means for detecting a reversal of polarization of said third capacitor responsive to concurrent signals applied to said first and second capacitors.

6. An electrical circuit comprising a plurality of ferroelectric input capacitors, all of said capacitors having one of their electrodes directly connected to a common terminal and having substantially the same hysteresis characteristics, a plurality of parallel branch circuits also connected to said common terminal, each of said branches including a ferroelectric output capacitor, the output capacitors of said branches having hysteresis characteristics such that the capactors of successive ones of said branches have successively greater coercive voltages and such that all of said capacitors transfer substantially the same amount of charge upon switching as do said input capacitors, means for setting the ferroelectric material of each of said capacitors to a predetermined condition of remanent polarization, means for selectively applying input signals to the other electrodes of said input capactors, and means responsive to said input signals for detecting polarization reversals in said output capacitors.

7. An electrical circuit according to claim 6 in which the output capacitor included in the first of said parallel branches has a hysteresis characteristic substantially the same as that possessed by said input capacitors and the output capacitor included in succeeding ones of said parallel branches have coercive voltages which are progressively increasing multiples of the coercive voltage of the output capacitor included in said first parallel branch.

8. An electrical circuit comprising an input ferroelectric capacitor, said input capacitor being serially connected to a plurality of parallel branches, one of said branches including a ferroelectric output capactor, each of the others of said branches including a ferroelectric control capacitor, each of said control capacitors having a hysteresis characteristic such that it transfers at least as much charge upon switching as does said input capacitor, said output capacitor having a hysteresis characteristic such that it has a substantially greater coervice voltage than any of said control capacitors, means for setting the ferroelectric material of each of said capacitors to a predetermined condition of remanent polarization, means for selectively applying input signals to said input capacitor to reverse the remanent polarization of said input capacitor, means for selectively preventing the switching of said control capacitors responsive to the signals applied to said input capacitor comprising means for selectively applying other input signals to said control capacitors simultaneously with said input signals applied to said input capacitor, and means for detecting the switching of said output capacitor responsive to the signals applied to said input capacitor.

9. An electrical circuit according to claim 8 in which said input capacitor and said control capacitors have substantially the same hysteresis characteristics and said output capacitor has a hysteresis characteristic such that it transfers the same amount of charge upon switching as do the other capacitors and has a coercive voltage substantially twice that of said other capacitors.

10. An electrical circuit comprising a plurality of input ferroelectric capacitors, all of said capacitors having one of their electrodes directly connected to a common terminal and having substantially the same hysteresis characteristics, an output ferroelectric capacitor also having one of its electrodes connected to said common terminal, means for setting the ferroelectric material of each of said capacitors to a predetermined condition of remanent polarization, means for applying input signals selectively to the other electrodes of said input capacitors to reverse the remanent polarization of said input capacitors, a plurality of other ferroelectric capacitors, each of said other ferroelectric capacitors also having one electrode connected to said common terminal and having a coercive voltage substantially smaller than that of said output capacitor, said other capacitors also being set to a predetermined condition of remanent polarization by said means for setting the ferroelectric material of each of said capacitors, said other capacitors having a total charge storing capacity equal to the total charge storing capacity of all excepting one of said input capacitors whereby said other capacitors conduct the entire amount of charge transferred during polarization reversals of said input capacitors except when the polarizations of all of said input capacitors are reversed, and output means for detecting a reversal of polarization of said output capacitor responsive to the application of input signals to all of said input capacitors.

11. An electrical circuit comprising a plurality of input ferroelectric capacitors, one electrode of each of said capacitors being directly connected to a common terminal, all of said capacitors having substantially the same hysteresis characteristics, means for setting the ferroelectric material of each of said capacitors to a predetermined condition of remanent polarization, means for applying input signals selectively to the other electrodes of said input capacitors, and means for detecting the application of input signals to all of said input capacitors comprising a plurality of branch circuits, each of said circuits including a ferroelectric output capacitor having one of its electrodes connected to said common terminal, all of said output capacitors having hysteresis characteristics such that they transfer the same amount of charge upon polarization reversals as do said input capacitors and such that each of said output capacitors has a different coercive voltage than that of any other of said output capacitors, and means for detecting the reversal of polarization of the one of said output capacitors having the greatest coercive voltage responsive to the application of input signals to all of said input capacitors.

References Cited by the Examiner

UNITED STATES PATENTS

| | | | |
|---|---|---|---|
| 2,854,590 | 9/58 | Wolfe | 340—173.2 X |
| 2,900,622 | 8/59 | Rajchman | 340—173.2 |
| 2,919,354 | 12/59 | Russell | 307—88 |
| 2,956,265 | 10/60 | Schwenzfeger | 340—173.2 |

IRVING L. SRAGOW, *Primary Examiner.*